United States Patent [19]

Koide

[11] Patent Number: 4,491,117

[45] Date of Patent: Jan. 1, 1985

[54] APPARATUS FOR SUPPLYING COOLED FUEL TO AN ENGINE

[75] Inventor: Hiroshi Koide, Okazaki, Japan

[73] Assignee: Toyota Jidosha Kabushiki Kaisha, Japan

[21] Appl. No.: 532,481

[22] Filed: Sep. 15, 1983

[30] Foreign Application Priority Data

Feb. 24, 1983 [JP] Japan .................................. 58-29986

[51] Int. Cl.³ ............................................ F02M 31/20
[52] U.S. Cl. ...................................... 123/541; 123/540
[58] Field of Search ............... 123/557, 540, 541, 542, 123/547, 468, 469, 470; 165/51, 52

[56] References Cited

U.S. PATENT DOCUMENTS

| | | | |
|---|---|---|---|
| 1,285,916 | 11/1918 | Bradburn | 123/547 |
| 1,542,823 | 6/1925 | Manville | 123/557 |
| 1,925,032 | 8/1933 | Dunner | 123/557 |
| 1,981,876 | 11/1934 | Moore | 123/547 |
| 2,175,126 | 10/1939 | McCormick | 123/541 |
| 3,628,516 | 12/1971 | Perrin | 123/541 |
| 4,015,567 | 4/1977 | Zabenskie | 123/557 |
| 4,059,080 | 11/1977 | Rudert | 123/541 |
| 4,099,501 | 7/1978 | Fairbanks | 123/557 |
| 4,155,337 | 5/1979 | Hensley | 123/541 |
| 4,170,203 | 10/1979 | Congram | 123/547 |
| 4,411,239 | 10/1983 | Kelch | 123/541 |

FOREIGN PATENT DOCUMENTS

| | | |
|---|---|---|
| 4851125 | 10/1971 | Japan . |
| 514411 | 6/1974 | Japan . |
| 128653 | 3/1979 | Japan .................................. 123/541 |

Primary Examiner—Ronald H. Lazarus
Attorney, Agent, or Firm—Parkhurst & Oliff

[57] ABSTRACT

An apparatus for supplying cooled fuel to the fuel injection valves of a fuel injected internal combustion engine. In the engine, there is a distribution tube having a fuel passage for fuel and a coolant passage for a cooling medium such as water or air. The fuel passage is provided in close proximity to the coolant passage, whereby the fuel in the fuel passage is cooled by the coolant in the coolant passage. Consequently, the cooled fuel is supplied to fuel injection valves.

20 Claims, 12 Drawing Figures

APPARATUS FOR SUPPLYING COOLED FUEL TO AN ENGINE

BACKGROUND OF THE INVENTION

The present invention relates to a fuel supplying system for a fuel injection type engine, and more particularly to an apparatus in which the fuel supplied to a combustion chamber of an engine is cooled by a coolant.

In a vehicle which has a fuel injection type engine, the engine idling may be unstable, especially at high environmental temperatures such as those occurring in the summertime. The reason for the unstable idling is that the temperature in the engine compartment significantly rises because of engine heat, resulting in the formation of vapor bubbles in the fuel distribution tube. The bubbles prevent the fuel from flowing smoothly thus decreasing the amount of fuel available for injection purposes.

A known solution to the above problem is a device wherein fuel in the fuel distribution tube has been cooled by a coolant such as water, air or the like. According to the known device, the cooling fluid passage and the fuel distribution tube were two separate parts. Therefore, because there are two separate parts, some type of assembly step is required before installing the assembly into the automobile, thus resulting in increased production costs.

SUMMARY OF THE INVENTION

The present invention was made in view of the foregoing background, and to overcome the foregoing drawbacks. It is accordingly an object of this invention to provide an easily manufactured apparatus for supplying cooled fuel to a fuel injection type engine, wherein the supplied fuel is cooled by a coolant.

To attain the above objects, an apparatus for supplying cooled fuel to a fuel injection type engine comprises:

a fuel tank;

a fuel pump for pumping fuel from the fuel tank to the engine;

a reservoir for a coolant;

means for supplying the coolant to the engine;

a fuel distribution tube provided in the engine, having a fuel passage allowing for fuel flow therein and a coolant passage allowing for coolant flow therein supplied by means therein; and a fuel injection valve, supplied with fuel from the fuel passage, for injecting fuel into the engine.

BRIEF DESCRIPTION OF THE DRAWINGS

The above objects, features and advantages of the present invention will become more apparent from reading the following description of the preferred embodiments taken in connection with the accompanying drawings wherein.

DETAILED DESCRIPTION OF THE PREFERRED EMBODIMENTS

The present invention is described in detail with reference to the accompanying drawings which illustrate different embodiments of a fuel distribution tube for a fuel injection type engine constructed in accordance with the present invention.

Figure 1:
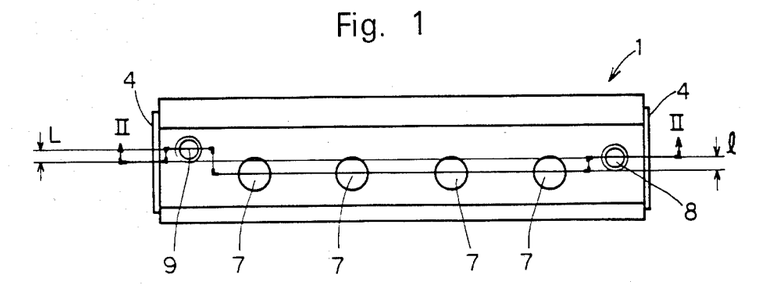
FIG. 1 is a front view of a fuel distribution tube used in a fuel injection type engine according to the first embodiment of the present invention.
Figure 2:
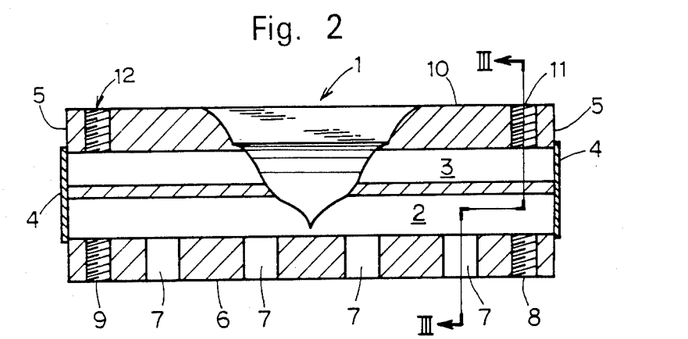
FIG. 2 is a cross-sectional view taken along the line II—II of FIG. 1.

FIG. 1 shows a front view of a fuel distribution tube utilized for a fuel injection type engine in accordance with the present invention. FIG. 2 shows a cross-sectional view taken along the line II—II of FIG. 1. In FIG. 2, a fuel passage 2 and a cooling medium passage 3 are provided within the fuel distribution tube 1, running approximately parallel to each other. Blind plates 4 are secured onto both ends of the fuel distribution tube 1 by welding or similar techniques. The openings 7 are provided within the sidewall 6 and connect the fuel passage 2 with the fuel injection valve. The number of the openings in the sidewall 6 is equivalent to the number of openings in the fuel injection valve. In this embodiment, there are four openings in the sidewall 6. The fuel supply opening 8 and the fuel discharge opening 9 are provided in the sidewall 6 near both ends of the fuel distribution tube 1, and are connected with the coolant passage 3. FIG. 1 further discloses that the center of the opening 7 is offset a distance l from the longitudinal center-line of fuel passage 2. The relative displacement between the opening 7 and the longitudinal center-line of fuel passage 2 is provided so that fuel supplied from the fuel passage 2 into the opening 7 will be free from any vapor bubbles, even if bubbles are present within the fuel passage. Further, the transverse center-line of the fuel opening 9 is offset a distance L from the transverse center-line of the fuel supply opening 8. Therefore, upon installation of the unit on the engine, the fuel discharge opening 9 is located on a horizontal plane which is above the horizontal plane of the fuel supply opening, thus providing a means for releasing any vapor bubbles generated within the fuel passage 2.

Figure 3:
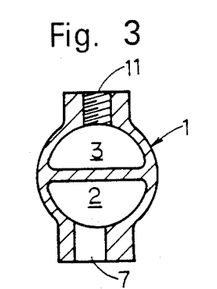
FIG. 3 is a cross-sectional view taken along the line III—III of FIG. 2.
Figure 4:
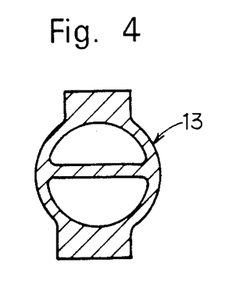
FIG. 4 is a cross-sectional view of a drawn or extruded pipe utilized for the fuel distribution tube used in the first embodiment of the present invention.

Referring next of FIG. 3, a cross-sectional view taken along the line III—III of FIG. 2 is shown. In FIG. 3, numeral 2 indicates the fuel passage and numeral 3 represents the coolant passage. The numeral 7 represents the opening for installing the fuel injection valve therein. The numeral 11 references the cooling fluid supply opening. As apparent from FIG. 3, the fuel distribution tube 1, according to the present embodiment, is manufactured by first drawing or extruding a pipe having a cross section similar to the cross-section disclosed in FIG. 4. The pipe is subsequently machined to form the required openings for the fuel injection valve, fuel supply, coolant supply and coolant discharge openings. The fuel distribution tube is designed so that the cooling fluid passage 3 and the fuel passage 2 are of equivalent size and shape. Therefore, because the fuel distribution tube is drawn or extruded, all transverse cross sections taken at any longitudinal point will be equivalent.

The aforementioned structure functions as follows: Fuel is supplied into the fuel passage 2 through the fuel supply opening 8. Because of the close proximity of the fuel passage 2 with the coolant passage 3, within the fuel distribution tube 1, the fuel in the passage 2 is cooled by the coolant in the passage 3. The cooled fuel is subsequently supplied to the fuel injection valves through the openings 7.

Figure 5:
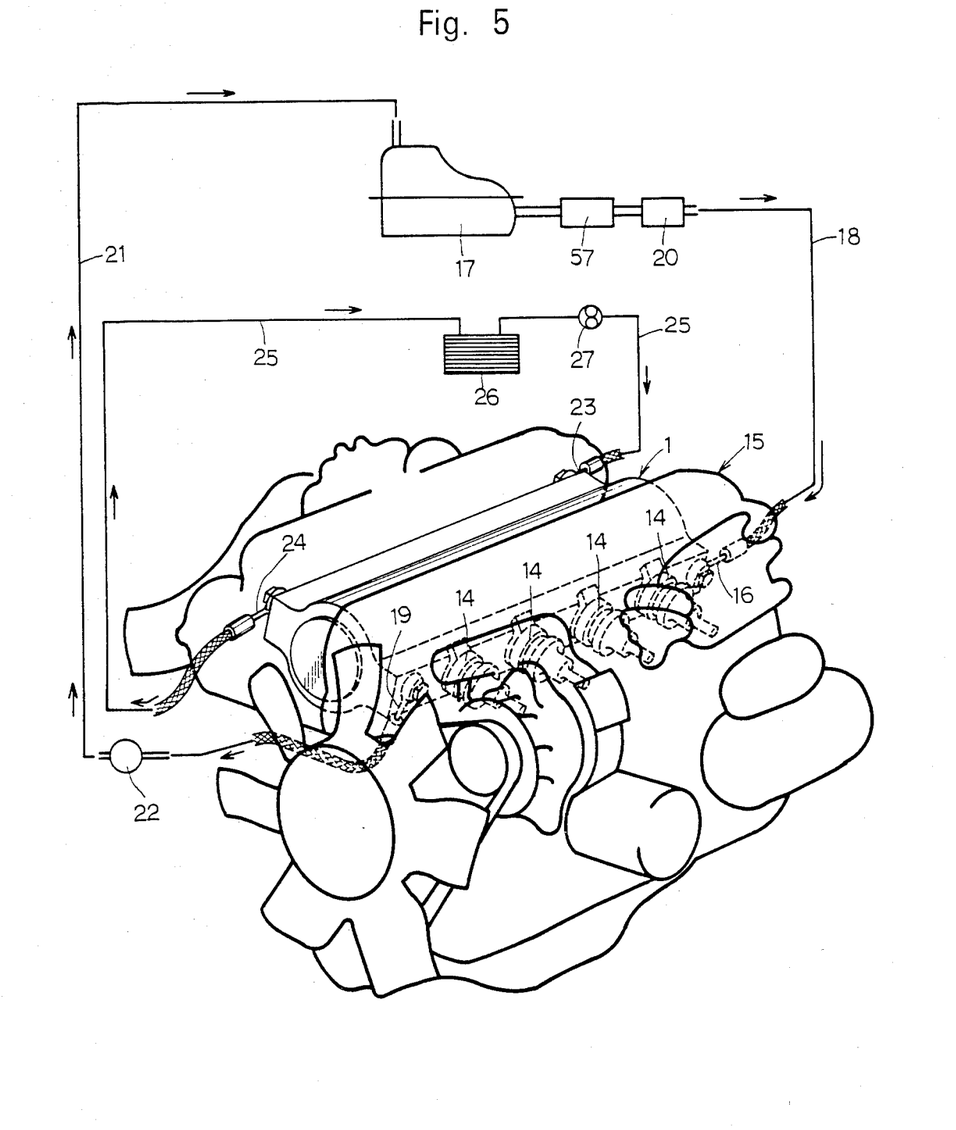
FIG. 5 is a partially schematic view of the fuel distribution tube of the first embodiment as applied to the engine.

FIG. 5 illustrates a partially schematic view of the fuel distribution tube 1, according to the aforementioned embodiment, as applied to an engine. In FIG. 5, one end of the fuel injection valves 14 is attached to the openings 7, and the other end is attached to the intake port of engine 15. The whole fuel distribution tube 1 is mounted on the fuel injection valves 14. The fuel supply union 16 is installed in the fuel supply opening 8. Further, the fuel discharge union 19 is installed in the fuel discharge opening 9. Fuel is supplied from the fuel tank 17 to the fuel filter 20 by the fuel pump 57, which is driven by an electric motor. The filtered fuel subsequently flows through the fuel pipe 18 and the fuel supply union 16 into the fuel passage 2 within the fuel distribution tube 1. The fuel discharge union 19 is connected with the fuel tank 17 by the fuel pipe 21. A fuel pressure regulator 22 is provided at a point along the fuel pipe 21. The fuel pressure regulator maintains a constant fuel pressure within the fuel passage 2.

The coolant supply union 23 is attached to the coolant supply opening 11 of the fuel distribution tube 1. Also, the coolant discharge union 24 is attached to the coolant discharge opening 12. The coolant supply union 23 is connected with the coolant discharge union 24 by the water pipe 25. A radiator 26 and a water pump 27 are provided at a point along the water pipe 25. The water pump is driven by another electric motor. The radiator 26 and the water pump 27 supply a cooling medium into the coolant passage 3 wherein a heat exchange process occurs between the warm fuel in the fuel supply passage 2 and the cooling medium, whereby the warmed coolant then exits through the discharge union 24 and returns to the radiator 26 to be cooled again. As a result of the fuel in the fuel passage 2 being cooled, there is a much smaller probability that a vapor bubble will be generated. Therefore, the unstable idling, caused from the presence of vapor bubbles in the supplied fuel, is prevented.

However, even if a vapor bubble is generated within the fuel supply passage 2, the bubble is reservoired in the upper portion of the fuel passage 2. This result occurs because upon installing the fuel distribution tube 1 on the engine, the openings 7, for the fuel injection valves 14, are located in a horizontal plane a distance L below the longitudinal center-line of the fuel passage 2. Therefore, any generated vapor bubble does not enter into the openings 7, which would result in the obstruction of fuel flow causing rough idling conditions. Alternatively, the generated vapor bubble flows along the top of the fuel supply passage 2 until it reaches the fuel discharge opening 9. The bubble is induced to flow out the discharge opening 9 because when the fuel distribution tube 1 is installed on the engine, the center-line of the discharge opening 9 lies in a horizontal plane a distance L above the center-line of the fuel supply opening 8.

According to the present embodiment, because the coolant passage 3 is provided within the fuel distribution tube 1, it is unnecessary to assemble any separate parts involving the coolant passage 3, thereby eliminating any need for assembling the fuel distribution tube prior to installing it on the engine, resulting in lower production costs. As previously discussed, the fuel distribution tube is easily produced by first utilizing an extrusion or drawing means, and then subsequently machining the necessary holes into the drawn pipe or the extruded pipe.

Figure 6:
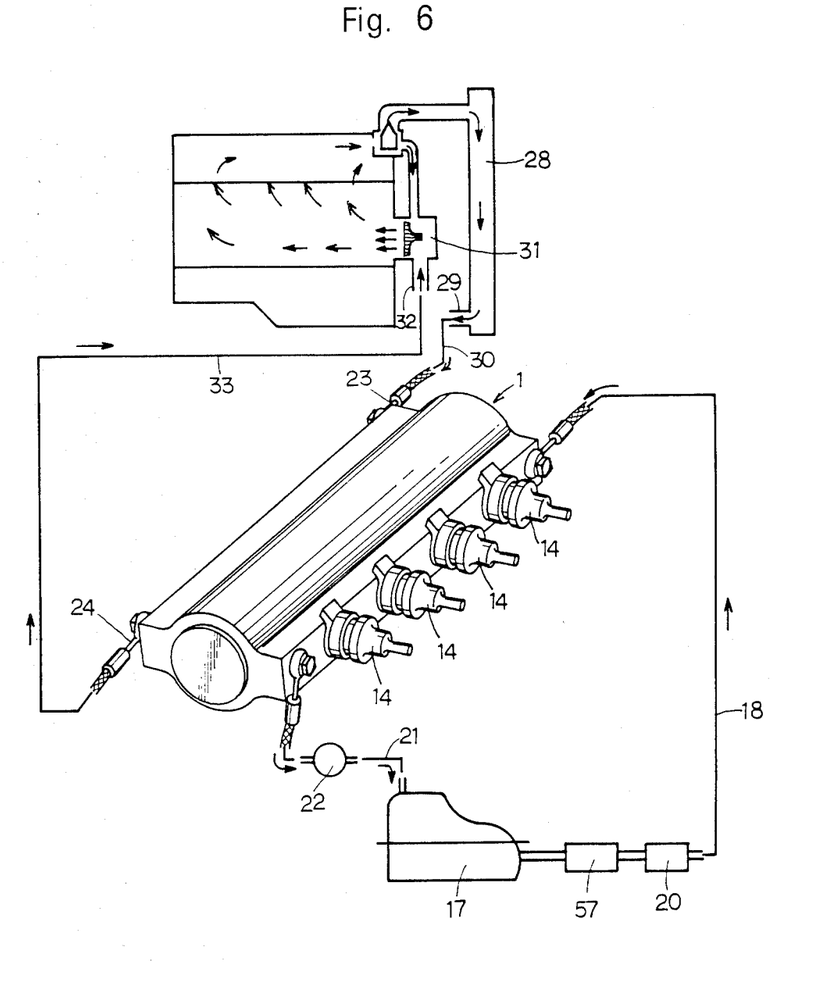
FIG. 6 is a partially schematic view of a cooling system wherein the engine coolant is used as the cooling medium.
Figure 7:
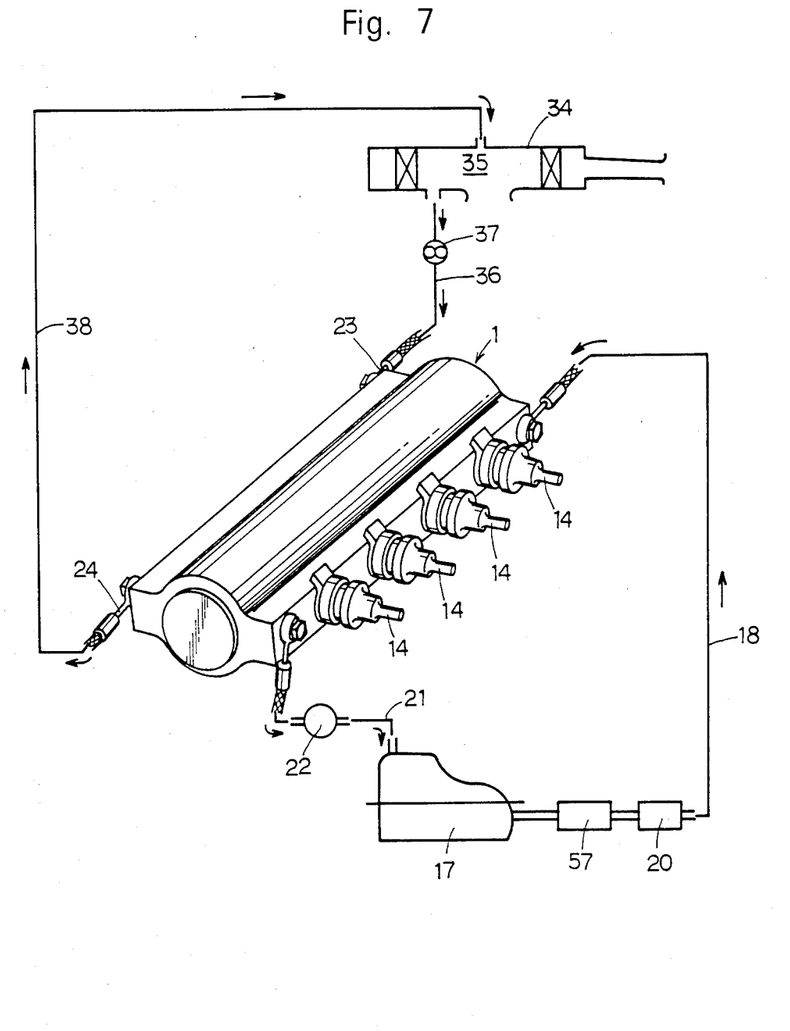
FIG. 7 is a partially schematic view of a cooling system wherein air is used as the cooling medium.
Figure 8:
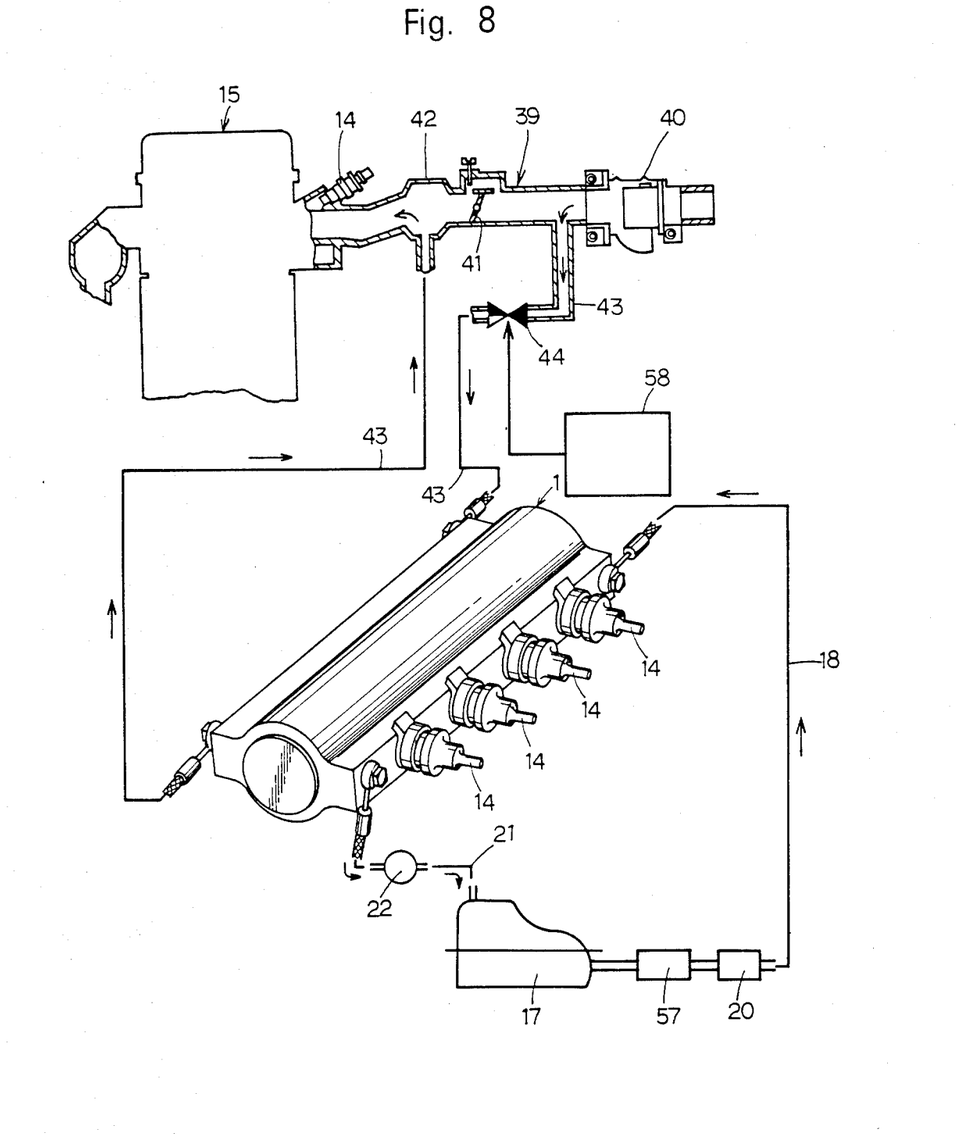
FIG. 8 is a partially schematic view of a cooling system wherein air flowing through an idling speed control device is used as the cooling medium.

FIGS. 6 through 8 illustrate different means for supplying coolant into the coolant passage 3 provided in the fuel distribution tube 1. In FIG. 6, the cooling fluid of the engine is provided as the coolant. The pressure of the fuel in the fuel distribution tube 1 is maintained at about 2.5 Kg/cm$^2$ (gauge pressure) by the fuel pump 57 working in conjunction with the fuel pressure regulator 22.

Vapor bubbles are usually generated when the temperature of fuel exceeds approximately 90° C. The temperature of the engine cooling fluid is approximately 50° C. Therefore, it is possible to use the engine coolant cooled by the radiator as a coolant for the fuel. In FIG. 6, the coolant discharge port 29 of the radiator 28 is connected with the coolant supply union 23 by the pipe 30. The coolant discharge union 24 is connected with the coolant inlet 32 of the water pump 31. According to the operation of water pump 31, water cooled by the radiator 28 is supplied into the coolant passage 3 of the fuel distribution tube 1, thereby cooling the fuel in the fuel passage 2 through a heat exchange process occurring between the two passages.

FIG. 7 illustrates a cooling system which utilizes air as the cooling medium. Air is cleaned by an air cleaner 34, and proceeds from the clean air side 35 of the air filter 34 through an air pipe 36 to an electrically driven air pump 37. The air pump 37 subsequently pumps air, utilizing the air pipe 36, into the coolant supply union 23. The air then flows through the coolant passage 3, and exits through the coolant discharge union 24 into the air pipe 38, which is connected with the air cleaner 34, which acts as a muffler absorbing the sound of exhaust air.

FIG. 8, illustrates an alternative cooling system in which air flowing through the idle speed control device, which is installed in a fuel injection type engine, is used as the coolant.

In this drawing, an air flow meter 40, a throttle valve 41, a surge tank 42 and a fuel injection valve 14 are provided on the intake passage 39 of engine 15. The idle speed control device has a bypass passage 43, which bypasses the throttle valve 41, and is connected with an air flow control valve 44 which opens and closes in accordance with instructions received from a computer 58. The bypass passage 43 is connected with the coolant passage 3 of the fuel distribution tube 1 by the coolant supply union 43. The idle speed control device supplies a small amount of air into the bypass passage 43 when the engine is idling thus cooling the fuel by a similar heat exchange means between the fuel supply passage 2 and the coolant supply passage 2, resulting in smooth engine idling.

Figure 9:
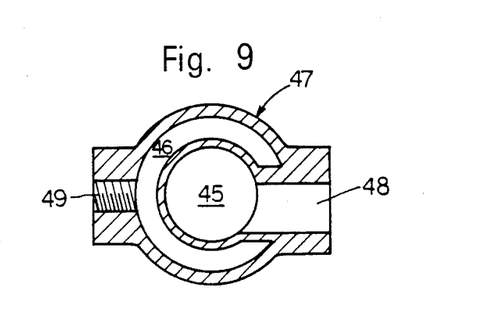
FIG. 9 is a cross-sectional view of a fuel distribution tube for fuel injection type engine according to the second embodiment of the present invention.
Figure 10:
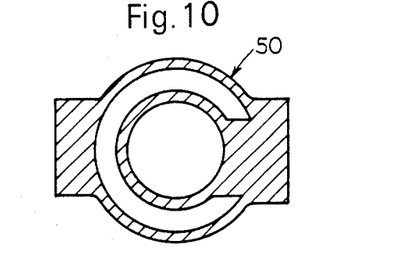
FIG. 10 is a cross-sectional view of a drawn pipe or an extruded pipe for fuel distribution tube used in the second embodiment of the present invention.

FIG. 9 is a cross-sectional view of a fuel distribution tube according to a second embodiment used in a fuel injection type engine. In this embodiment, a "C" shaped coolant passage 46 is parallelly provided within the fuel distribution tube 47 in a manner which surrounds the fuel passage 45 therein. The numeral 48 indicates the opening that the fuel injection valve fits into. A coolant enters the cooling passage 46 through the coolant supply opening 49. FIG. 10 displays the cross section of a drawn pipe or an extruded pipe which must be subsequently machined to form the device of FIG. 9. Any other construction, and the actual operation of the fuel distribution tube, is equivalent to the disclosure given in the first embodiment.

Figure 11:
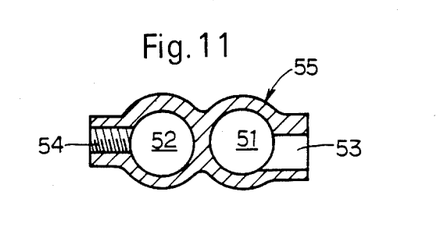
FIG. 11 is a cross-sectional view of a fuel distribution tube for fuel injection type engine according to the third embodiment of the present invention.
Figure 12:
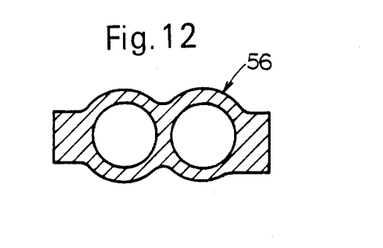
FIG. 12 is a cross-sectional view of a drawn pipe or an extruded pipe for fuel distribution tube used in the third embodiment of the present invention.

FIG. 11 is a cross-sectional view of a fuel distribution tube according to a third embodiment of the present invention. In this embodiment, a fuel passage 51 and a coolant passage 52, whose cross sections are circular, are provided parallel to each other in a fuel distribution tube 55. The numeral 53 indicates the opening that the fuel injection valve fits into and the numeral 54 represents the coolant supply port. FIG. 12 displays the cross section of a drawn pipe or an extruded pipe which must be subsequently machined to form the device of FIG. 11. Any other construction, and the actual operation of the fuel distribution tube, is equivalent to the disclosure given in the first embodiment.

While the present invention has been disclosed in its preferred embodiments, it is to be understood that the invention is not limited thereto but may be otherwise embodied within the scope of the following claims.

What is claimed is:

1. An apparatus for supplying cooled fuel into an internal combustion engine, comprising:
   a fuel tank;
   a fuel pump for pumping fuel from the tank to the engine;
   a reservoir for a coolant;
   means for supplying the coolant to the engine;
   a fuel distribution tube provided in the engine, having a fuel passage permitting fuel flow therein provided by said fuel pump and a coolant passage permitting coolant flow therein, provided by said coolant supplying means, said fuel passage and coolant passage being separate but in close proximity for facilitating heat exchange between fluids in those passages, respectively, said fuel distribution tube having fuel injection valve openings therein; and
   a plurality of fuel injection valves integrally communicated with said openings for injecting fuel supplied through the fuel passage into the engine,
   wherein the fuel supplied to the fuel injection valve is cooled by the coolant flowing in the coolant passage before being injected into the internal combustion engine.

2. The apparatus of claim 1, wherein the fuel distribution tube comprises two tubes having semi-circular cross sections; with the flat portion of each tube adjacently parallel to the other, one tube comprising a fuel passage and the other tube comprising a coolant passage.

3. The apparatus of claim 2, wherein the longitudinal centerline of the fuel distribution tube is in a horizontal plane which is relatively displaced from the horizontal plane in which lie the longitudinal centerlines of the fuel injection valve openings of the fuel distribution tube.

4. The apparatus of claim 2, wherein the fuel distribution tube includes a fuel supply opening, and a fuel discharge opening, and the longitudinal centerline of the fuel supply opening is in a horizontal plane which is relatively displaced from the horizontal plane in which lies the longitudinal centerline of the fuel discharge opening.

5. The apparatus of claim 1, wherein the fuel distribution tube comprises two tubes, one being the fuel passage tube having a circular cross section, and the other being the coolant passage tube having a "C" shaped cross section, with the fuel passage tube being substantially concentric with the "C" shaped coolant passage tube.

6. The apparatus of claim 5, wherein the longitudinal centerline of the fuel distribution tube is in a horizontal plane which is relatively displaced from the horizontal plane created by the longitudinal centerlines of the fuel injection valve openings.

7. The apparatus of claim 5, wherein the fuel distribution tube includes a fuel supply opening, and a full discharge opening, and the longitudinal centerline of the fuel supply opening is in a horizontal plane which is relatively displaced from the horizontal plane in which lies the longitudinal centerline of the fuel discharge opening.

8. The apparatus of claim 1, wherein the fuel distribution tube comprises two tubes, one being the fuel passage tube and the other being the coolant passage tube, each having a circular cross section, with the longitudinal centerlines of each tube running parallel to each other within the fuel distribution tube.

9. The apparatus of claim 8, wherein the longitudinal centerline of the fuel distribution tube is in a horizontal plane which is relatively displaced from the horizontal plane in which lie the longitudinal centerlines of the fuel injection valve openings of the fuel distribution tube.

10. The apparatus of claim 8, wherein the fuel distribution tube includes a fuel supply opening, and a fuel discharge opening, and the longitudinal centerline of the fuel supply opening is in a horizontal plane which is relatively displaced from the horizontal plane in which lies the longitudinal centerline of the fuel discharge opening.

11. The apparatus of claim 1, wherein the coolant is water.

12. The apparatus of claim 11, wherein the coolant is water and the reservoir is the radiator of the engine.

13. The apparatus of claim 1, wherein the coolant is air.

14. The apparatus of claim 13, wherein the coolant is air coming from an air cleaner which supplies filtered air to the engine.

15. The apparatus of claim 13, wherein the engine includes a throttle valve through which the coolant air is supplied.

16. The apparatus of claim 15, wherein the engine includes a bypass passage which bypasses the throttle valve, and an air flow valve within the bypass passage, which valve is opened and closed for controlling the flow of coolant air.

17. An apparatus for supplying cooled fuel into an internal combustion engine, comprising:

a fuel tank;

a fuel pump for pumping fuel from the tank to the engine;

a reservoir for a coolant;

means for supplying the coolant to the engine;

a fuel distribution tube provided in the engine, having a fuel passage permitting fuel flow therein provided by said fuel pump and a coolant passage permitting coolant flow therein, provided by said coolant supplying means, said fuel passage and coolant passage being separate but in close proximity for facilitating heat exchange between fluids in those passages, respectively, said fuel distribution tube having fuel injection valve openings therein, wherein the longitudinal centerline of the fuel distribution tube is in a horizontal plane which is relatively displaced from a horizontal plane in which lie the longitudinal centerlines of the fuel injection valve openings of the fuel distribution tube; and a plurality of fuel injection valves integrally communicated with said openings for injecting fuel supplied through the fuel passage into the engine, wherein the fuel supplied to the fuel injection valve is cooled by the coolant flowing in the coolant passage before being injected into the internal combustion engine.

18. The apparatus of claim 17, wherein the fuel distribution tube comprises two tubes having semi-circular cross-sections with the flat portion of each tube adjacently parallel to the other, one tube comprising a fuel passage and the other tube comprising a coolant passage.

19. An apparatus for supplying cooled fuel into an internal combustion engine, comprising:

a fuel tank;

a fuel pump for pumping fuel from the tank to the engine;

a reservoir for a coolant;

means for supplying the coolant to the engine;

a fuel distribution tube provided in the engine, having a fuel passage with a circular cross-section permitting fuel flow therein, provided by said fuel pump and a coolant passage with a "C" shaped cross-section permitting coolant flow therein, provided by said coolant supplying means, said fuel passage and coolant passage being substantially concentrically positioned and said fuel passage and said coolant passage being separate but in close proximity for facilitating heat exchange between fluids in those passages, respectively, said fuel distribution tube having fuel injection valve openings therein, wherein the longitudinal centerline of the fuel distribution tube is in a horizontal plane which is relatively displaced from a horizontal plane in which lie the longitudinal centerlines of the fuel injection valve openings of the fuel distribution tube; and a plurality of fuel injection valves integrally communicated with said openings for injecting fuel supplied through the fuel passage into the engine, wherein the fuel supplied to the fuel injection valve is cooled by the coolant flowing in the coolant passage before being injected into the internal combustion engine.

20. An apparatus for supplying cooled fuel into an internal combustion engine, comprising:

a fuel tank;

a fuel pump for pumping fuel from the tank to the engine;

a reservoir for a coolant;

means for supplying the coolant to the engine;

a fuel distribution tube provided in the engine, having a fuel passage with a circular cross-section permitting fuel flow therein, provided by said fuel pump and a coolant passage with a circular cross-section permitting coolant flow therein, provided by said coolant supplying means, said fuel passage and coolant passage being substantially parallely positioned and said fuel passage and said coolant passage being separate but in close proximity for facilitating heat exchange between fluids in those passages, respectively, said fuel distribution tube having fuel injection valve openings therein, wherein the longitudinal centerline of the fuel distribution tube is in a horizontal plane which is relatively displaced from a horizontal plane in which lie the longitudinal centerlines of the fuel injection valve openings of the fuel distribution tube; and a plurality of fuel injection valves integrally communicated with said openings for injecting fuel supplied through the fuel passage into the engine, wherein the fuel supplied to the fuel injection valve is cooled by the coolant flowing in the coolant passage before being injected into the internal combustion engine.

* * * * *